United States Patent
Yamada et al.

(10) Patent No.: US 10,849,147 B2
(45) Date of Patent: Nov. 24, 2020

(54) SYSTEMS AND METHODS FOR ACCOMMODATING SPECIFIC USER EQUIPMENTS

(71) Applicant: Sharp Kabushiki Kaisha, Sakai (JP)

(72) Inventors: Shohei Yamada, Sakai (JP); Katsunari Uemura, Sakai (JP); Yasuyuki Kato, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/542,453

(22) PCT Filed: Dec. 28, 2015

(86) PCT No.: PCT/JP2015/006490
§ 371 (c)(1),
(2) Date: Jul. 10, 2017

(87) PCT Pub. No.: WO2016/120949
PCT Pub. Date: Aug. 4, 2016

(65) Prior Publication Data
US 2018/0279341 A1    Sep. 27, 2018

Related U.S. Application Data

(60) Provisional application No. 62/108,652, filed on Jan. 28, 2015.

(51) Int. Cl.
*H04W 4/00* (2018.01)
*H04W 72/12* (2009.01)
(Continued)

(52) U.S. Cl.
CPC ....... *H04W 72/1273* (2013.01); *H04L 1/0041* (2013.01); *H04L 1/0042* (2013.01);
(Continued)

(58) Field of Classification Search
CPC . H04W 72/1273; H04L 1/0041; H04L 1/1812
See application file for complete search history.

(56) References Cited

U.S. PATENT DOCUMENTS

2015/0181533 A1    6/2015  Chen et al.
2015/0181576 A1*   6/2015  Papasakellariou .... H04L 5/0053
                                                      370/329
(Continued)

FOREIGN PATENT DOCUMENTS

WO    2014/109566 A1    7/2014

OTHER PUBLICATIONS

Official Communication issued in International Patent Application No. PCT/JP2015/006490, dated Feb. 16, 2016.
(Continued)

*Primary Examiner* — Bo Hui A Zhu
(74) *Attorney, Agent, or Firm* — Keating & Bennett, LLP

(57) ABSTRACT

A method by a user equipment (UE) is described. The method includes determining a repetition level, determining a initialization value for a scrambling sequence generator based on the repetition level, generating the scrambling sequence, and applying the scrambling sequence for a Physical Downlink Shared Channel (PDSCH). The repetition level is associated with the PDSCH and determined by a Radio Resource Control (RRC) configuration.

12 Claims, 5 Drawing Sheets

(51) Int. Cl.
  H04L 25/03 (2006.01)
  H04L 1/00 (2006.01)
  H04L 1/18 (2006.01)
  H04L 1/08 (2006.01)
  H04W 48/08 (2009.01)

(52) U.S. Cl.
  CPC .............. H04L 1/0045 (2013.01); H04L 1/08 (2013.01); H04L 1/1812 (2013.01); H04L 1/1887 (2013.01); H04L 25/03866 (2013.01); H04W 48/08 (2013.01)

(56) References Cited

U.S. PATENT DOCUMENTS

2015/0257173 A1   9/2015  You et al.
2015/0280876 A1*  10/2015  You ...................... H04L 5/0048
                                                      370/329
2018/0007543 A1*  1/2018  Lee ........................... H04L 5/00

OTHER PUBLICATIONS

LG Electronics; "PBCH and SIB Enhancement for Coverage-limiting UE's"; 3GPP TSG RAN WG1; Meeting#72bis; R1-131296; Apr. 15-19, 2013; 5 pages.

Huawei; "Consideration on the scrambling of PDSCH for MU-MIMO"; 3GPP TSG RAN WG1 Meeting #53; R1-081782; May 5-9, 2008; 3 pages.

Alcatel-Lucent, et al.; "Coverage enhancement for PDSCH"; 3GPP TSG-RAN WG1 Meeting #76; R1-140156; Feb. 10-14, 2014; 3 pages.

Intel Corporation; "Coverage Improvement for PRACH"; 3GPP TSG RAN WG1 Meeting #76; R1-140115; Feb. 10-14, 2014; 10 pages.

MediaTek, Inc.; "Discussion on Potential Solutions for Physical Channels for Rel-13 MTC UE"; 3GPP TSG-RAN WG1 Meeting #78 BIS; R1-144122; Oct. 6-10, 2014; 5 pages.

* cited by examiner

SYSTEMS AND METHODS FOR ACCOMMODATING SPECIFIC USER EQUIPMENTS

TECHNICAL FIELD

The present disclosure relates generally to communication systems. More specifically, the present disclosure relates to systems and methods for accommodating specific user equipments.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility, low complexity and efficiency have been sought. However, improving communication capacity, speed, flexibility, low complexity and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

SUMMARY OF INVENTION

One embodiment of the present invention discloses a method by a user equipment (UE), comprising: determining a repetition level; determining a initialization value for a scrambling sequence generator based on the repetition level; generating the scrambling sequence; and applying the scrambling sequence for a Physical Downlink Shared Channel (PDSCH), wherein the repetition level is associated with the PDSCH and determined by a Radio Resource Control (RRC) configuration.

Another embodiment of the present invention discloses a method by an evolved Node B (eNB), comprising: determining a repetition level; determining a initialization value for a scrambling sequence generator based on the repetition level; generating the scrambling sequence; and applying the scrambling sequence for a Physical Downlink Shared Channel (PDSCH), wherein the repetition level is associated with the PDSCH and determined by a Radio Resource Control (RRC) configuration.

Yet another embodiment of the present invention discloses a user equipment (UE), comprising: a processor; and memory in electronic communication with the processor, wherein instructions stored in the memory are executable to: determine a repetition level; determine a initialization value for a scrambling sequence generator based on the repetition level; generate the scrambling sequence; and apply the scrambling sequence for a Physical Downlink Shared Channel (PDSCH), wherein the repetition level is associated with the PDSCH and determined by a Radio Resource Control (RRC) configuration.

Yet another embodiment of the present invention discloses an evolved Node B (eNB), comprising: a processor; and memory in electronic communication with the processor, wherein instructions stored in the memory are executable to: determine a repetition level; determine a initialization value for a scrambling sequence generator based on the repetition level; generate the scrambling sequence; and apply the scrambling sequence for a Physical Downlink Shared Channel (PDSCH), wherein the repetition level is associated with the PDSCH and determined by a Radio Resource Control (RRC) configuration.

DESCRIPTION OF EMBODIMENTS

Figure 1:
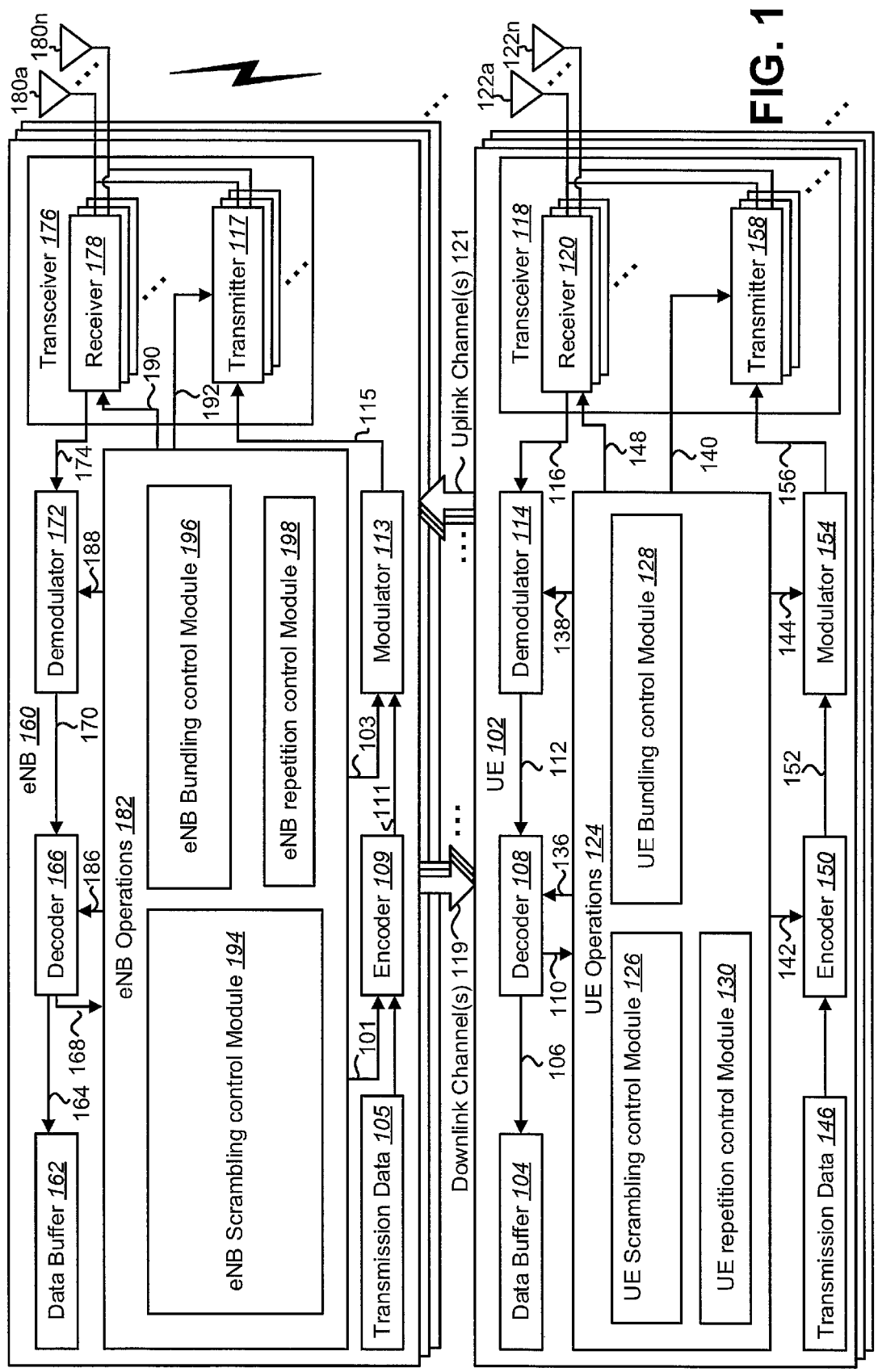
FIG. 1 is a block diagram illustrating one configuration of one or more evolved Node Bs (eNBs) and one or more user equipments (UEs) in which systems and methods for accommodating specific user equipments may be implemented.

A method for by a user equipment (UE) is described. The method includes determining a level, determining a initialization value for a scrambling sequence generator based on at least the level, generating the scrambling sequence, and applying the scrambling sequence for a Physical Downlink Shared Channel (PDSCH). The level may be determined based on at least Transmission Time Interval (TTI) bundle size for the PDSCH. The level may be determined for the UE with a predefined category. The UE with a predefined category may receive system information which is included in system information block type 1A which is different from system information block type 1 and transmitted by using TTI bundling.

A method by an evolved Node B (eNB) is also described. The method includes determining a level, determining a initialization value for a scrambling sequence generator based on at least the level, generating the scrambling sequence, and applying the scrambling sequence for a Physical Downlink Shared Channel (PDSCH). The level may be determined based on at least Transmission Time Interval (TTI) bundle size for the PDSCH. The level may be determined for user equipments (UEs) with a predefined category. The UEs with a predefined category may receive system information which is included in system information block type 1A which is different from system information block type 1 and transmitted by using TTI bundling.

A user equipment (UE) is also described: The UE includes a processor and memory in electronic communication with the processor. Instructions stored in the memory are executable to determine a level, determine a initialization value for a scrambling sequence generator based on at least the level, generate the scrambling sequence, and apply the scrambling sequence for a Physical Downlink Shared Channel (PDSCH). The level may be determined based on at least Transmission Time Interval (TTI) bundle size for the PDSCH. The level may be determined for the UE with a predefined category. The UE with a predefined category may receive system information which is included in system information block type 1A which is different from system information block type 1 and transmitted by using TTI bundling.

An evolved Node B (eNB) is also described. The eNB includes a processor and memory in electronic communication with the processor. Instructions stored in the memory are executable to determine a level, determine a initialization value for a scrambling sequence generator based on at least the level, generate the scrambling sequence, and apply the scrambling sequence for a Physical Downlink Shared Channel (PDSCH). The level may be determined based on at least Transmission Time Interval (TTI) bundle size for the PDSCH. The level may be determined for user equipments (UEs) with a predefined category. The UEs with a predefined category may receive system information which is included in system information block type 1A which is different from system information block type 1 and transmitted by using TTI bundling.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12 and/or 13). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDCCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB. However, in a small cell deployment scenario, each node (e.g., eNB, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

Instead of having lots of features in a UE, the system and method described herein may enhance the accommodation of UEs with new type or new category which have limited features (e.g. specific UEs). Especially, such UEs may be efficient for Machine-Type Communications (MTC), but it is noted that it is not limited to MTC use case. The provision of Machine-Type Communications (MTC) via cellular networks is proving to be a significant opportunity for new revenue generation for mobile operators. "Low cost & enhanced coverage MTC UE for LTE" in Release 12 specified a low complexity LTE device for MTC with Bill of Material cost approaching that of an Enhanced General Packet Radio Service (EGPRS) modem using a combination of complexity reduction techniques. However, results from the study indicated that further complexity reduction of LTE devices for MTC can be achieved if additional complexity reduction techniques are supported.

In addition, the study in Release 12 concluded that a coverage improvement target of 15-20 dB for both Frequency Division Duplex (FDD) and Time Division Duplex (TDD) in comparison to normal LTE footprint could be achieved to support the use cases where MTC devices are deployed in challenging locations, e.g. deep inside buildings, and to compensate for gain loss caused by complexity reduction techniques.

The general objective is to specify a new UE in LTE that also allows for enhanced coverage compared to existing LTE networks and low power consumption, with the following detailed objectives. It may be to specify a new low complexity UE category/type for MTC operation in any LTE duplex mode (full duplex FDD, half duplex FDD, TDD) based on the Rel-12 low complexity UE category/type supporting the following additional capabilities. It may be to reduced UE bandwidth of 1.4 MHz (i.e., 6 Physical Resource Blocks (PRBs)) in downlink and uplink. It may be a bandwidth reduced UEs should be able to operate within any system bandwidth. It may be frequency multiplexing of bandwidth reduced UEs and non-MTC UEs should be supported. It may be that the UE only needs to support 1.4 MHz RF bandwidth in downlink and uplink. The present disclosure relates especially to how low complexity, bandwidth reduced and/or coverage enhanced UEs (e.g., specific UEs, MTC UEs) can be accommodated in current and future LTE system.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for accommodating specific UEs may be implemented. The one or more UEs 102 may communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a cell-specific reference signal (CRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE scrambling control module 126, a UE bundling control module 128, and a UE repetition control module 130. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity.

The UE operations module 124 may provide the benefit of scrambling the physical channel (e.g., PDSCH, PUSCH) efficiently. The UE scrambling control module 126 may include a scrambling sequence generator. A scrambling sequence generator may be initialized at the start of each subframe, where the initialization value of $c_{init}$ may be determined based on a level (e.g., repetition level, TTI_BUNDLE_SIZE), Radio Network Temporary Identifier (RNTI) associated with the physical channel (e.g., PDSCH, PUSCH) transmission, and/or a physical layer cell identify.

The initialization value of $c_{init}$ may depend on the transport channel type according to $$c_{init} = \begin{cases} (\lfloor (n_{RNTI} \cdot L)/4 \rfloor \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases},$$

where
$n_{RNTI}$
may correspond to the RNTI associated with the physical channel (e.g., PDSCH, PUSCH) transmission. L may be the level (e.g., repetition level, TTI_BUNDLE_SIZE) associated with the physical channel (e.g., PDSCH, PUSCH) transmission and/or the RNTI. Up to two codewords can be transmitted in one subframe, i.e., $$q \in \{0,1\}$$

In the case of single codeword transmission, q is equal to zero.

For each codeword q, the block of bits $$b^{(q)}(0), \ldots, b^{(q)}(M_{bit}^{(q)}-1),$$

where
$M_{bit}^{(q)}$
may be the number of bits in codeword q transmitted on the physical channel in one subframe, may be scrambled prior to modulation, resulting in a block of scrambled bits $$\tilde{b}^{(q)}(0), \ldots, \tilde{b}^{(q)}(M_{bit}^{(q)}-1)$$

according to $$\tilde{b}^{(q)}(i) = (b^{(q)}(i) + c^{(q)}(i)) \bmod 2$$

where the scrambling sequence
$c^{(q)}(i)$
may be given by the following pseudo-random sequences. The scrambling sequence generator may be initialized at the start of each subframe. The pseudo-random sequences may be defined by a length-31 Gold sequence. The output sequence c(n) of length $M_{PN}$, where $$n=0,1,\ldots,M_{PN}-1,$$

is defined by $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + (n)) \bmod 2$$

where $N_C=1600$ and the first m-sequence may be initialized with $$x_1(0)=1, x_1(n)=0, n=1,2,\ldots,30.$$

The initialization of the second m-sequence is denoted by $$c_{init} = \Sigma_{i=0}^{30} x_2(i) \cdot 2_i$$

with the value depending on the application of the sequence.

The UE operations module 124 may provide information 148 to the one or more receivers 120. For example, the UE operations module 124 may inform the receiver(s) 120 when or when not to receive transmissions based on the RRC message (e.g., broadcasted system information, RRC connection reconfiguration message), MAC control element, and/or the DCI (Downlink Control Information).

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The UE bundling control module 128 may control a TTI bundling operation. The UE repetition control module 130 may control a repetition operation.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of an eNB scrambling control module 194, an eNB bundling control module 196, and an eNB repetition control module 198. The eNB operations module 182 may include PHY entities, MAC entities, RLC entities, PDCP entities, and an RRC entity.

The eNB operations module 182 may provide the benefit of scrambling the physical channel (e.g., PDSCH, PUSCH) efficiently. The eNB scrambling control module 194 may include a scrambling sequence generator. A scrambling sequence generator may be initialized at the start of each subframe, where the initialization value of $c_{init}$ may be determined based on a level (e.g., repetition level, TTI_BUNDLE_SIZE), RNTI associated with the physical channel (e.g., PDSCH, PUSCH) transmission, and/or a physical layer cell identify.

The initialization value of $c_{init}$ may depend on the transport channel type according to $$c_{init} = \begin{cases} (\lfloor(n_{RNTI} \cdot L)/4\rfloor \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases},$$

where $n_{RNTI}$ may correspond to the RNTI associated with the physical channel (e.g., PDSCH, PUSCH) transmission. L may be the level (e.g., repetition level, TTI_BUNDLE_SIZE) associated with the physical channel (e.g., PDSCH, PUSCH) transmission and/or the RNTI. Up to two codewords can be transmitted in one subframe, i.e., $q \in \{0,1\}$ In the case of single codeword transmission, q is equal to zero. $n_s$ is a slot number (0 through 20) in one radio frame.

For each codeword q, the block of bits)

$b^{(q)}(0), \ldots, b^{(q)}(M_{bit}^{(q)}-1)$, where $M_{bit}^{(q)}$ may be the number of bits in codeword q transmitted on the physical channel in one subframe, may be scrambled prior to modulation, resulting in a block of scrambled bits $\tilde{b}^{(q)}(0), \ldots, \tilde{b}^{(q)}(M_{bit}^{(q)}-1)$ according to $\tilde{b}^{(q)}(i) = (b^{(q)}(i) + c^{(q)}(i)) \bmod 2$ where the scrambling sequence $c^{(q)}(i)$ may be given by the following pseudo-random sequences. The scrambling sequence generator may be initialized at the start of each subframe. The pseudo-random sequences may be defined by a length-31 Gold sequence. The output sequence c(n) of length $M_{PN}$, where $n = 0, 1, \ldots, M_{PN}-1$, is defined by $c(n) = (x_1(n+N_C) + x_2(n+N_C)) \bmod 2$ $x_1(n+31) = (x_1(n+3) + x_1(n)) \bmod 2$ $x_2(n+31) = (x_2(n+3) + x_2(n+2) + x_2(n+1) + (n)) \bmod 2$ where $N_C = 1600$ and the first m-sequence may be initialized with $x_1(0) = 1, x_1(n) = 0, n = 1, 2, \ldots, 30$.

The initialization of the second m-sequence is denoted by $c_{init} = \sum_{i=0}^{30} x_2(i) \cdot 2^i$ with the value depending on the application of the sequence.

The eNB operations module 182 may provide information 190 to the one or more receivers 178. For example, the eNB operations module 182 may inform the receiver(s) 178 when or when not to receive transmissions based on the RRC message (e.g., broadcasted system information, RRC connection reconfiguration message), MAC control element, and/or the DCI (Downlink Control Information).

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

The eNB bundling control module 196 may control a TTI bundling operation. The eNB repetition control module 198 may control a repetition operation.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
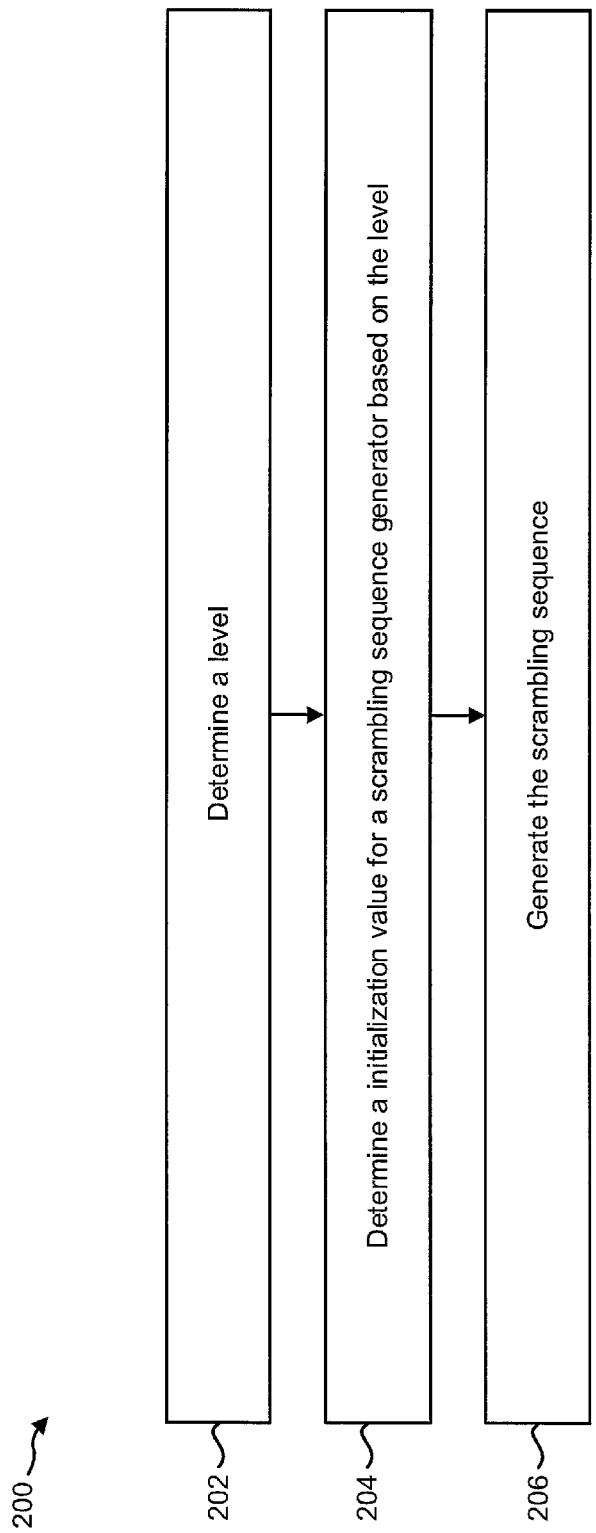
FIG. 2 is a flow diagram illustrating one implementation of a method for generating a scrambling sequence by a UE.

FIG. 2 is a flow diagram illustrating one implementation of a method 200 for generating a scrambling sequence by a UE 102.

The UE 102 may determine 202 a level (e.g., repetition level, TTI_BUNDLE_SIZE and/or a type of UE). The level may be per physical channel, transport channel and/or RNTI. For low complexity UEs, due to reducing the number for antenna port and/or reducing maximum transmission power, a plurality of downlink or uplink transmissions for one data transmission may be required to compensate such a reduced capability. Furthermore, the plurality of downlink or uplink transmissions for one data transmission may be used for a coverage enhancement feature. For the plurality of transmissions for Physical Downlink Control Channel (PDCCH), Physical Random Access Channel (PRACH), Enhanced PDCCH (EPDCCH), and/or Physical Uplink Control Channel (PUCCH), a repetition may be used. For the plurality of transmissions for Physical Downlink Shared Channel (PDSCH) and/or Physical Uplink Shared Channel (PUSCH), Transmission Time Interval (TTI) bundling may be used.

When TTI bundling is configured, the parameter TTI_bundle size (e.g., TTI_BUNDLE_SIZE) provides the number of TTIs of a TTI bundle. TTI bundling operation relies on a Hybrid automatic repeat request (HARQ) entity for invoking the same HARQ process for each transmission that is part of the same bundle. Within a bundle HARQ retransmissions are non-adaptive and triggered without waiting for feedback from previous transmissions according to TTI_BUNDLE_SIZE The HARQ feedback of a bundle is only transmitted (e.g., HARQ feedback for PDSCH) or received (e.g., HARQ feedback for PUSCH) for the last TTI of the bundle (i.e., the TTI corresponding to TTI_BUNDLE_SIZE), regardless of whether a transmission in that TTI takes place or not (e.g. when a measurement gap occurs). A retransmission of a TTI bundle is also a TTI bundle.

The level may be TTI_BUNDLE_SIZE. A set of values of TTI_BUNDLE_SIZE may be associated with the level. For example, Level #1 (e.g., L=1) may be for TTI_BUNDLE_SIZE=4. Level #2 may be for TTI_BUNDLE_SIZE=8. For another example, Level #1 may be for TTI_BUNDLE_SIZE=4 through 7. Level #2 may be for TTI_BUNDLE_SIZE=8 through 32. A level may be a repetition level. For example, Level #1 may be for 4 times repetition. Level #2 may be for 8 times repetition.

A level may be a type of UEs. UEs may be categorized into a few types. For example, Type 1 UE (e.g., L=1) may be categorized into existing category (e.g., category (0) through (13)). Type 2 UE may be a bandwidth reduced UE. Type 2 UE may support a certain level's repetition and/or bundling (e.g., for coverage compensation or coverage enhancement). The Type 2 UE may be categorized into category (−1). Additionally, the Type 3 UE may be defined. The Type 3 UE may support a higher level's repetition and/or bundling. Namely, the Type 3 UE may support more times repetition or larger size bundling than the Type 2 UE. The Type1 UE may be configured with system information which is included in System Information Block Type1 (SIB1). The Type 2 UE and/or the Type 3 UE may be configured with system information which is broadcasted and/or included in System Information Block Type 1A (SIB1A) which is different from SIB1 and transmitted by using TTI bundling or repetition.

The level may be determined based on one or more of TTI_BUNDLE_SIZE, a repetition level and a type of the UE 120. The level may be determined based on RRC configurations which are broadcasted as system information or signaled via dedicated signaling. The level may be determined additionally or alternatively based on Reference Signal Received Power (RSRP), Received Signal Strength Indicator (RSSI), and/or Reference Signal Received Quality (RSRQ) based on cell-specific reference signal (CRS) or other reference signals.

The UE 102 may determine 204 a initialization value for a scrambling sequence generator for a PDSCH transmission and/or for a PUSCH transmission. As described in FIG. 1, the initialization value of $c_{init}$ may be determined based on a level (e.g., repetition level, TTI_BUNDLE_SIZE), RNTI associated with the physical channel (e.g., PDSCH, PUSCH) transmission, and/or a physical layer cell identify. For example, the following initialization value may be used. L may be the level (e.g., repetition level, TTI_BUNDLE_SIZE) associated with the physical channel (e.g., PDSCH, PUSCH) transmission and/or the RNTI.

$$c_{init} = \begin{cases} (\lfloor (n_{RNTI} \cdot L)/4 \rfloor \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases},$$

For another example, the RNTI may be defined for the level. For example, for the Type 1 UEs, RNTI values may be presented in Table 7.1-1 and their usage and associated Transport Channels and Logical Channels are presented in Table 7.1-2.

TABLE 7.1-1

RNTI values.

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

TABLE 7.1-2

RNTI usage.

| RNTI | Usage | Transport Channel | Logical Channel |
| --- | --- | --- | --- |
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

P-RNTI is Paging RNTI. C-RNTI is Cell RNTI. M-RNTI is MBMS RNTI. RARNTI is Random Access RNTI. SI-RNTI is System Information RNTI. C-RNTI is Cell RNTI. TPC-PUCCH-RNTI is Transmit Power Control-Physical Uplink Control Channel-19-RNTI. TPC-PUSCH-RNTI is Transmit Power Control-Physical Uplink Shared Channel-RNTI For the Type 2 and/or Type 3 UEs, RNTI values may be determined based on the level. For example, a value of P-RNTI for Level #1 (e.g., for the Type 1 UE) is FFFE and a value of P-RNTI for Level #2 is FFFC. For another example, RNTI may be defined as $L \times (RNTI$ for the Type 1 $UEs)$.

A value of RA-RNTI for Level #1 (e.g., for the Type 1 UE) is 0001 and a value of RA-RNTI for Level #2 is 0002. Then, The initialization value of $c_{init}$ may be defined as the following.

$$c_{init} = \begin{cases} (n_{RNTI} \cdot 2^{14} + q \cdot 2^{13} + \lfloor n_s/2 \rfloor \cdot 2^9 + N_{ID}^{cell} & \text{for } PDSCH \\ \lfloor n_s/2 \rfloor \cdot 2^9 + N_{ID}^{MBSFN} & \text{for } PMCH \end{cases}$$

The UE 102 may generate 206 the scrambling sequence. The UE 102 may apply the scrambling sequence to decode the PDSCH and/or to encode the PUSCH. For each codeword q, the block of bits $b^{(q)}(0), \ldots, b^{(q)}(M_{bit}^{(q)}-1)$, where $M_{bit}^{(q)}$ may be the number of bits in codeword q transmitted on the physical channel in one subframe, may be scrambled prior to modulation, resulting in a block of scrambled bits $\tilde{b}^{(q)}(0), \ldots, \tilde{b}^{(q)}(M_{bit}^{(q)}-1)$ according to $\tilde{b}^{(q)}(i) = (b^{(q)}(i) + c^{(q)}(i)) \bmod 2$ where the scrambling sequence $c^{(q)}(i)$ may be given by the following pseudo-random sequences. The scrambling sequence generator may be initialized at the start of each subframe. The pseudo-random sequences may be defined by a length-31 Gold sequence. The output sequence c(n) of length $M_{PN}$, where $n = 0, 1, \ldots, M_{PN}-1$, is defined by $c(n) = (x_1(n+N_C) + x_2(n+N_C)) \bmod 2$ $x_1(n+31) = (x_1(n+3) + x_1(n)) \bmod 2$ $x_2(n+31) = (x_2(n+3) + x_2(n+2) + x_2(n+1) + (n)) \bmod 2$ where $N_C = 1600$ and the first m-sequence may be initialized with $x_1(0) = 1, x_1(n) = 0, n = 1, 2, \ldots, 30$.

The initialization of the second m-sequence is denoted by $c_{init} = \Sigma_{i=0}^{30} x_2(i) \cdot 2^i$ with the value depending on the application of the sequence.

Figure 3:
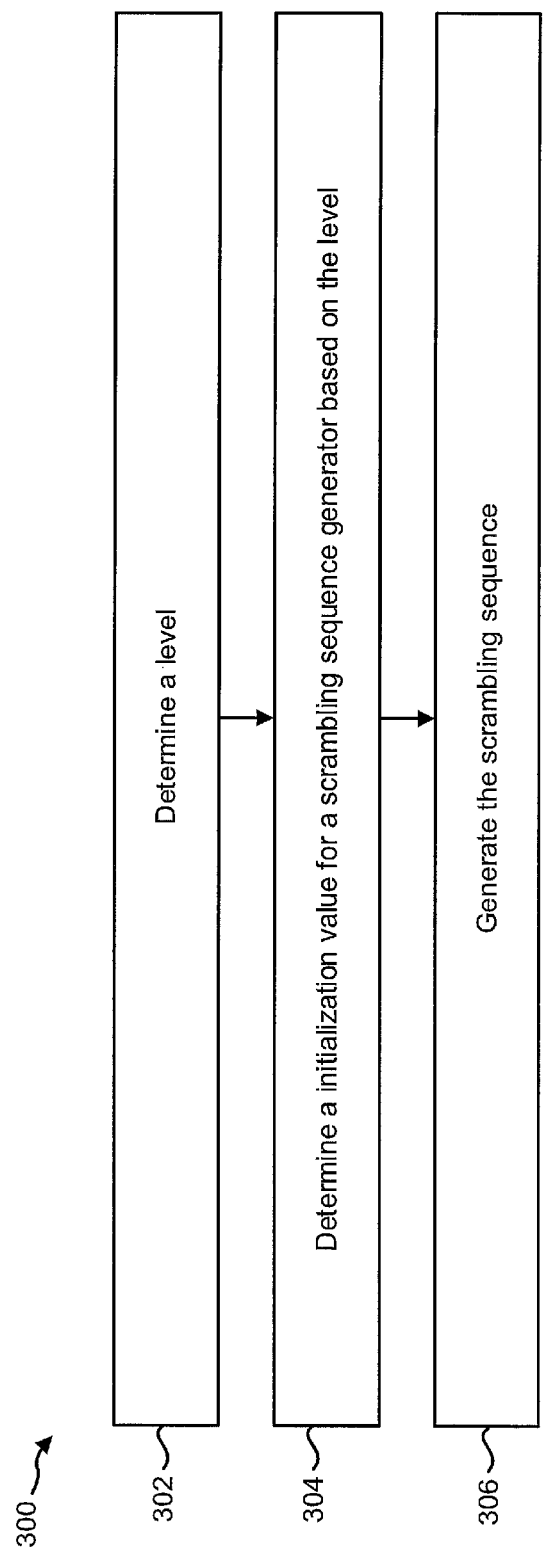
FIG. 3 is a flow diagram illustrating one implementation of a method for generating a scrambling sequence by an eNB.

FIG. 3 is a flow diagram illustrating one implementation of a method 300 for generating a scrambling sequence by an eNB 160.

The eNB 160 may determine 302 a level. As described in explanations in FIG. 2, the level may be determined based on one or more of TTI_BUNDLE_SIZE, a repetition level and a type of the UE 120. The level may be signaled via dedicated signaling to the UE 120. The level may be determined additionally or alternatively based on information informed by the UE 120.

The eNB 160 may determine 304 a initialization value for a scrambling sequence generator for a PDSCH transmission and/or for a PUSCH transmission. As described in FIG. 1, the initialization value of $c_{init}$ may be determined based on a level (e.g., repetition level, TTI_BUNDLE_SIZE), RNTI associated with the physical channel (e.g., PDSCH, PUSCH) transmission, and/or a physical layer cell identify. For example, the following initialization value may be used. L may be the level (e.g., repetition level, TTI_BUNDLE_SIZE) associated with the physical channel (e.g., PDSCH, PUSCH) transmission and/or the RNTI.

$$c_{init} = \begin{cases} (\lfloor(n_{RNTI} \cdot L)/4\rfloor \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases},$$

For another example, the RNTI may be defined for the level. For example, for the Type 1 UEs, RNTI values may be presented in Table 7.1-1 and their usage and associated Transport Channels and Logical Channels are presented in Table 7.1-2.

For the Type 2 and/or Type 3 UEs, RNTI values may be determined based on the level. For example, a value of P-RNTI for Level #1 (e.g., for the Type 1 UE) is FFFE and a value of P-RNTI for Level #2 is FFFC. For another example, RNTI may be defined as $L \times (RNTI$ for the Type 1 $UEs)$.

A value of RA-RNTI for Level #1 (e.g., for the Type 1 UE) is 0001 and a value of RA-RNTI for Level #2 is 0002. Then, The initialization value of $c_{init}$ may be defined as the following.

$$c_{init} = \begin{cases} (n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

The eNB 160 may generate 306 the scrambling sequence. The eNB 160 may apply the scrambling sequence to decode the PDSCH and/or to encode the PUSCH. For each codeword q, the block of bits $b^{(q)}(0), \ldots, b^{(q)}(M_{bit}^{(q)}-1)$, where $M_{bit}^{(q)}$ may be the number of bits in codeword q transmitted on the physical channel in one subframe, may be scrambled prior to modulation, resulting in a block of scrambled bits $\tilde{b}^{(q)}(0), \ldots, \tilde{b}^{(q)}(M_{bit}^{(q)}-1)$ according to $\tilde{b}^{(q)}(i) = (b^{(q)}(i) + c^{(q)}(i)) \mod 2$ where the scrambling sequence $c^{(q)}(i)$ may be given by the following pseudo-random sequences. The scrambling sequence generator may be initialized at the start of each subframe. The pseudo-random sequences may be defined by a length-31 Gold sequence. The output sequence c(n) of length $M_{PN}$, where $n = 0, 1, \ldots, M_{PN}-1$, is defined by $c(n) = (x_1(n+N_C) + x_2(n+N_C)) \mod 2$ $x_1(n+31) = (x_1(n+3) + x_1(n)) \mod 2$ $x_2(n+31) = (x_2(n+3) + x_2(n+2) + x_2(n+1) + (n)) \mod 2$ where $N_C = 1600$ and the first m-sequence may be initialized with $x_1(0) = 1, x_1(n) = 0, n = 1, 2, \ldots, 30$.

The initialization of the second m-sequence is denoted by $c_{init} = \sum_{i=0}^{30} x_2(i) \cdot 2^i$ with the value depending on the application of the sequence.

Broadcasted system information may be periodically transmitted at the RRC layer. For each transmission of system information (e.g., logical channel) at the RRC layer, HARQ operation may be performed at the MAC layer. HARQ operation may include TTI bundling. Repetition control for PDSCH, PUSCH, PDCCH, EPDCCH, PUCCH, and/or PRACH may be performed at the PHY layer. Data and/or RRC control information is mapped to logical channels. The MAC entity may be responsible for mapping logical channels for uplink onto uplink transport channels. The MAC entity may be responsible for mapping the downlink logical channels to downlink transport channels.

For the Type 2 and/or Type 3 UEs, new physical channel may be introduced. For example, PDSCH, PUSCH, PDCCH, EPDCCH, PUCCH, and PRACH above may be referred to as MTC-PDSCH, MTC-PUSCH, MTC-PDCCH, MTC-EPDCCH, MTCPUCCH, and MTC-PRACH respectively. For another example, PDSCH, PUSCH, PDCCH, EPDCCH, PUCCH, and PRACH above may be referred to as PDSCH for type 2 UE, PUSCH for type 2 UE, PDCCH for type 2 UE, EPDCCH for type 2 UE, PUCCH for type 2 UE, and PRACH for type 2 UE respectively. For yet another example, PDSCH, PUSCH, PDCCH, EPDCCH, PUCCH, and PRACH above may be referred to as PDSCH with TTI bundle size X, PUSCH with TTI bundle size X, PDCCH with repetition level X, EPDCCH with repetition level X, PUCCH with repetition level X, and PRACH with repetition level X, respectively, where X is a integer.

Figure 4:
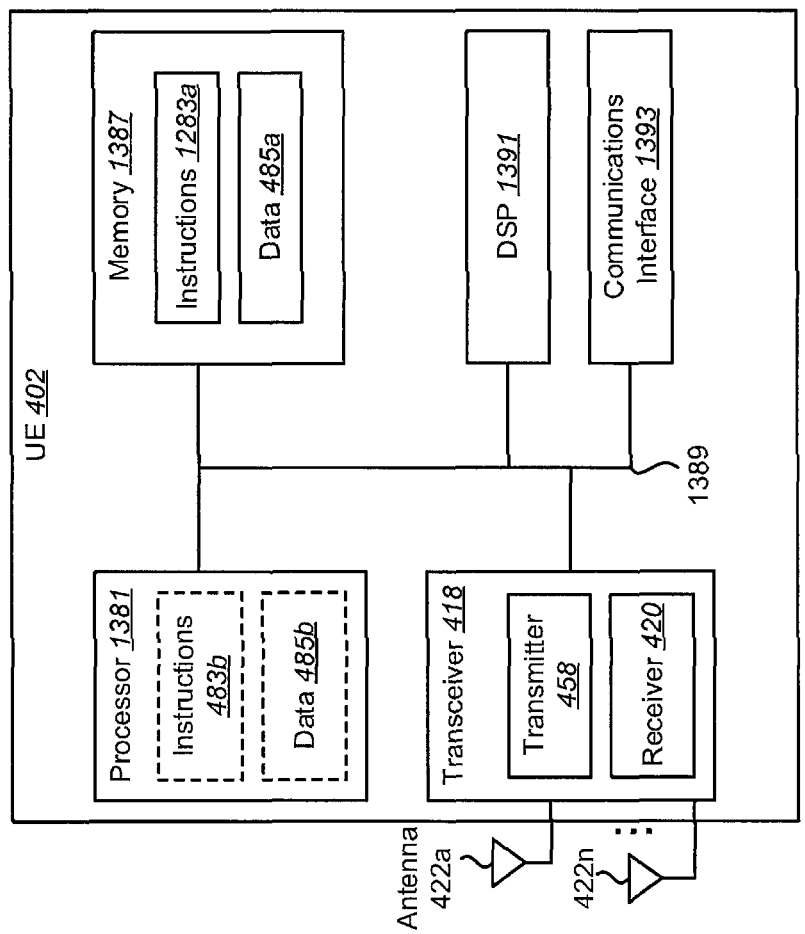
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. The UE 402 includes a processor 1381 that controls operation of the UE 402. The processor 1381 may also be referred to as a central processing unit (CPU). Memory 1387, which may include read-only memory (ROM), random access memory (RAM), a combination of the two or any type of device that may store information, provides instructions 1283*a* and data 485*a* to the processor 1381. A portion of the memory 1387 may also include non-volatile random access memory (NVRAM). Instructions 483*b* and data 485*b* may also reside in the processor 1381. Instructions 483*b* and/or data 485*b* loaded into the processor 1381 may also include instructions 1283*a* and/or data 485*a* from memory 1387 that were loaded for execution or processing by the processor 1381. The instructions 483*b* may be executed by the processor 1381 to implement one or more of the methods 200 and 400 described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422a-n are attached to the housing and electrically coupled to the transceiver 418.

The various components of the UE 402 are coupled together by a bus system 1389, which may include a power bus, a control signal bus and a status signal bus, in addition to a data bus. However, for the sake of clarity, the various buses are illustrated in FIG. 4 as the bus system 1389. The UE 402 may also include a digital signal processor (DSP) 1391 for use in processing signals. The UE 402 may also include a communications interface 1393 that provides user access to the functions of the UE 402. The UE 402 illustrated in FIG. 4 is a functional block diagram rather than a listing of specific components.

Figure 5:
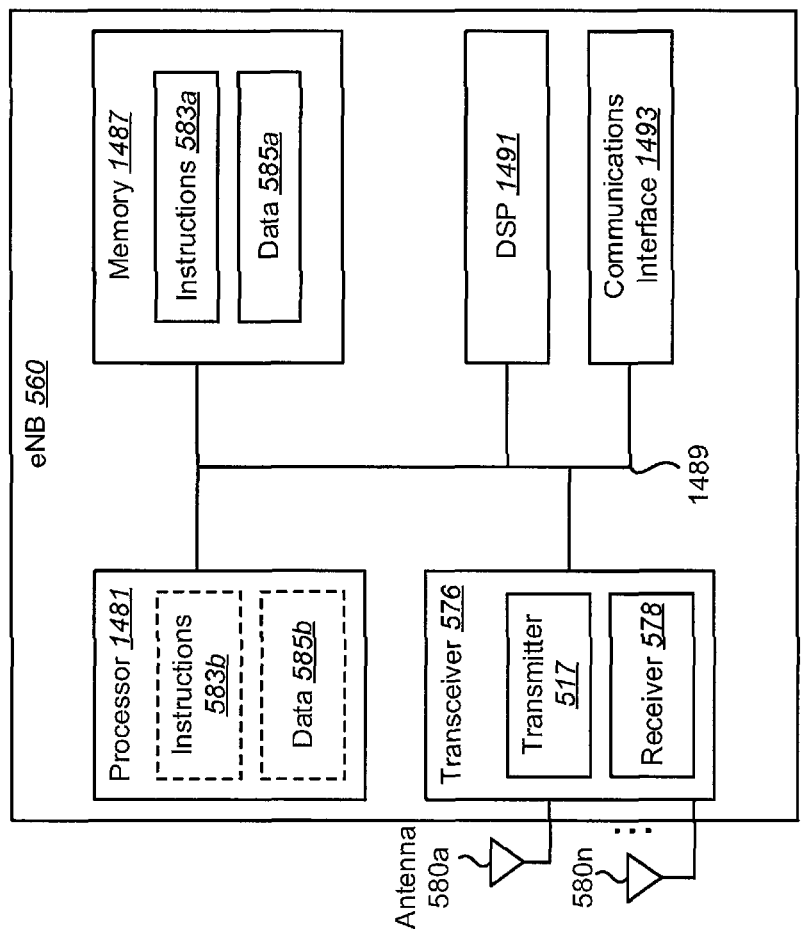
FIG. 5 illustrates various components that may be utilized in an eNB.

FIG. 5 illustrates various components that may be utilized in an eNB 560. The eNB 560 described in connection with FIG. 5 may be implemented in accordance with the eNB 160 described in connection with FIG. 1. The eNB 560 includes a processor 1481 that controls operation of the eNB 560. The processor 1481 may also be referred to as a central processing unit (CPU). Memory 1487, which may include read-only memory (ROM), random access memory (RAM), a combination of the two or any type of device that may store information, provides instructions 583a and data 585a to the processor 1481. A portion of the memory 1487 may also include nonvolatile random access memory (NVRAM). Instructions 583b and data 585b may also reside in the processor 1481. Instructions 583b and/or data 585b loaded into the processor 1481 may also include instructions 583a and/or data 585a from memory 1487 that were loaded for execution or processing by the processor 1481. The instructions 583b may be executed by the processor 1481 to implement one or more of the methods 300 and 500 described above.

The eNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580a-n are attached to the housing and electrically coupled to the transceiver 576.

The various components of the eNB 560 are coupled together by a bus system 1489, which may include a power bus, a control signal bus and a status signal bus, in addition to a data bus. However, for the sake of clarity, the various buses are illustrated in FIG. 5 as the bus system 1489. The eNB 560 may also include a digital signal processor (DSP) 1491 for use in processing signals. The eNB 560 may also include a communications interface 1493 that provides user access to the functions of the eNB 560. The eNB 560 illustrated in FIG. 5 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray(registered trademark) disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A method by a user equipment (UE), comprising:
    determining a repetition level;
    determining an initialization value for a scrambling sequence generator with use of a formula including a first parameter based on the repetition level and a second parameter based on a Radio Network Temporary Identifier (RNTI);
    generating a scrambling sequence by initializing the scrambling sequence generator with use of the initialization value; and
    applying the scrambling sequence for a Physical Downlink Shared Channel (PDSCH), wherein
    a block of bits of the PDSCH is scrambled by the scrambling sequence, and
    the repetition level is associated with the PDSCH and determined by a Radio Resource Control (RRC) configuration.

2. The method of claim 1, wherein the repetition level is determined for the UE with a coverage enhancement.

3. The method of claim 2, wherein the UE with the coverage enhancement receives system information which is included in system information block type 1A which is different from system information block type 1 and transmitted by using Transmission Time Interval (TTI) bundling.

4. A method by an evolved Node B (eNB), comprising:
    determining a repetition level;
    determining an initialization value for a scrambling sequence generator with use of a formula including a first parameter based on the repetition level and a second parameter based on a Radio Network Temporary Identifier (RNTI);
    generating a scrambling sequence by initializing the scrambling sequence generator with use of the initialization value; and
    applying the scrambling sequence for a Physical Downlink Shared Channel (PDSCH), wherein
    a block of bits of the PDSCH is scrambled by the scrambling sequence, and
    the repetition level is associated with the PDSCH and determined by a Radio Resource Control (RRC) configuration.

5. The method of claim 4, wherein the repetition level is determined for user equipments (UEs) with a coverage enhancement.

6. The method of claim 5, wherein the UE with the coverage enhancement receives system information which is included in system information block type 1A which is different from system information block type 1 and transmitted by using Transmission Time Interval (TTI) bundling.

7. A user equipment (UE), comprising:
a processor; and
memory in electronic communication with the processor, wherein instructions stored in the memory are executable to:
determine a repetition level;
determine an initialization value for a scrambling sequence generator with use of a formula including a first parameter based on the repetition level and a second parameter based on a Radio Network Temporary Identifier (RNTI);
generate a scrambling sequence by initializing the scrambling sequence generator with use of the initialization value; and
apply the scrambling sequence for a Physical Downlink Shared Channel (PDSCH), wherein
a block of bits of the PDSCH is scrambled by the scrambling sequence, and
the repetition level is associated with the PDSCH and determined by a Radio Resource Control (RRC) configuration.

8. The user equipment of claim 7, wherein the repetition level is determined for the UE with a coverage enhancement.

9. The user equipment of claim 8, wherein the UE with the coverage enhancement receives system information which is included in system information block type 1A which is different from system information block type 1 and transmitted by using Transmission Time Interval (TTI) bundling.

10. An evolved Node B (eNB), comprising:
a processor; and
memory in electronic communication with the processor, wherein instructions stored in the memory are executable to:
determine a repetition level;
determine an initialization value for a scrambling sequence generator with use of a formula including a first parameter based on the repetition level and a second parameter based on a Radio Network Temporary Identifier (RNTI);
generate the scrambling sequence by initializing the scrambling sequence generator with use of the initialization value; and
apply the scrambling sequence for a Physical Downlink Shared Channel (PDSCH), wherein
a block of bits of the PDSCH is scrambled by the scrambling sequence, and
the repetition level is associated with the PDSCH and determined by a Radio Resource Control (RRC) configuration.

11. The evolved Node B of claim 10, wherein the repetition level is determined for user equipments (UEs) with a coverage enhancement.

12. The evolved Node B of claim 11, wherein the UE with the coverage enhancement receives system information which is included in system information block type 1A which is different from system information block type 1 and transmitted by using Transmission Time Interval (TTI) bundling.

* * * * *